United States Patent Office 3,033,349
Patented May 8, 1962

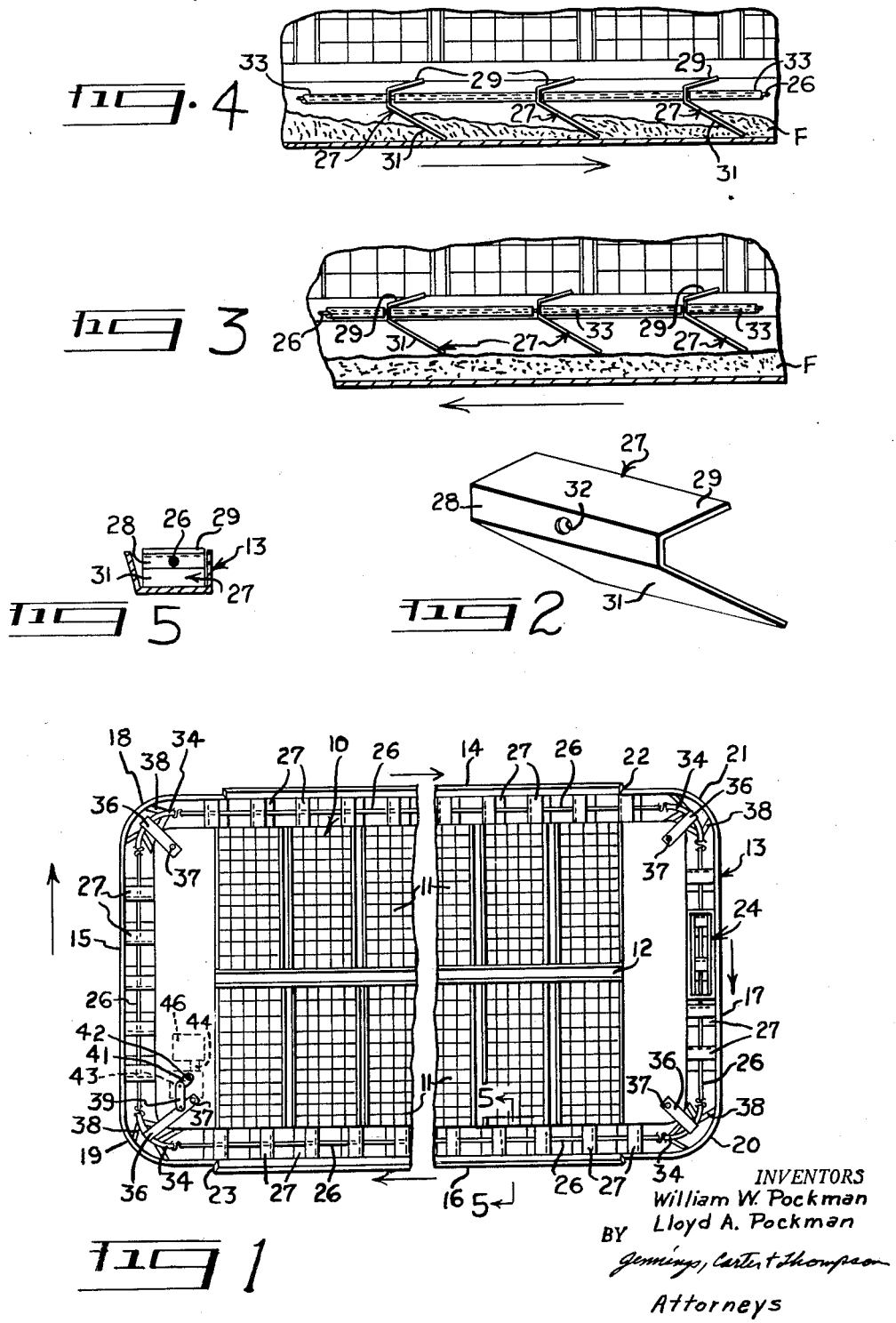

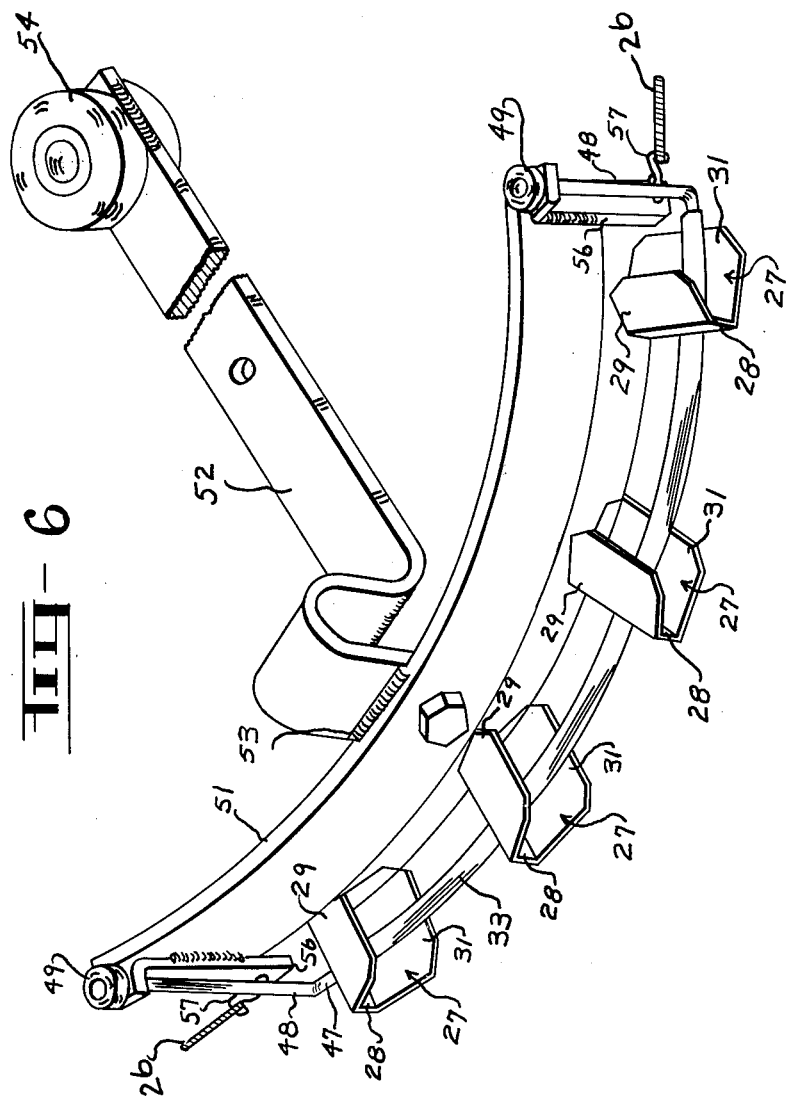

3,033,349
APPARATUS FOR CONVEYING GRANULAR MATERIALS
William W. Pockman and Lloyd A. Pockman, Decatur, Ala., assignors to Montgomery and Crawford Co., Inc., a corporation of Delaware
Filed June 11, 1959, Ser. No. 819,596
13 Claims. (Cl. 198—85)

This invention relates to apparatus for conveying granular material and more particularly to a reciprocatory conveyor which is adapted to convey granular material through a conduit.

An object of our invention is to provide apparatus for conveying granular material of the character designated which shall embody an elongated flexible member extending longitudinally of a conduit and having a plurality of longitudinally spaced impellers mounted thereon which are adapted, upon movement of the impellers in one direction, to dig into the granular material to move the same forward and, upon movement of the impellers in the opposite direction, to raise the impellers and the entire flexible member relative to the granular material whereby the impellers move over and relative to the granular material on the return stroke.

Another object of our invention is to provide reciprocatory conveying apparatus for moving granular materials in a single direction in a conduit whereby a minimum of feed is moved rearwardly on the return stroke.

A further object of our invention is to provide reciprocatory apparatus for conveying granular material through a conduit in which a maximum amount of the granular material is moved forward on the forward stroke.

A still further object of our invention is to provide apparatus for conveying granular material of the character designated which shall be simple of construction, economical of manufacture, and which is sturdy of construction, thereby particularly adapting the same for use with conventional type poultry cages and the like.

Apparatus embodying features of our invention is illustrated in the accompanying drawing, forming a part of this application, in which:

FIG. 1 is a plan view, partly broken away, showing our improved conveying apparatus associated with poultry laying cages;

FIG. 2 is an enlarged perspective view, showing one of our impellers removed from the remainder of the apparatus;

FIG. 3 is an enlarged fragmental view, partly broken away and in section, showing the position of the impellers and the actuating member attached thereto relative to the granular material as the impellers are moved rearwardly on the return stroke;

FIG. 4 is an enlarged fragmental view, partly broken away and in section, showing the position of the impellers and the actuating member attached thereto as the impellers are moved forwardly upon longitudinal forward movement of the actuating member;

FIG. 5 is an enlarged sectional view taken generally along the line 5—5 of FIG. 1; and, FIG. 6 is an enlarged perspective view showing our improved impellers mounted for conveying granular material around corners.

Referring now to the drawing for a bettter understanding of our invention, we show a double row of laying cages indicated generally by the numeral 10 which comprises a plurality of individual cages 11 arranged in back-to-back relationship with a water trough 12 positioned therebetween. The cages 11 and the water trough 12 are supported by suitable means, not shown.

Surrounding the double row of cages 10 and attached thereto by any suitable means is a continuous open-top feed trough or conduit 13 which is in position to afford access by the birds in the cages to the feed contained in the conduit. As shown in FIG. 1, the trough may be substantially rectangular, as viewed in plan, whereby it is provided with linear sections 14, 15, 16 and 17. The linear sections 14 and 15 are connected to each other by an arcuate section 18. The linear sections 15 and 16 are connected by an arcuate section 19. The linear sections 16 and 17 are connected by an arcuate section 20 and the linear sections 14 and 17 are connected by an arcuate section 21.

The linear portions 14 and 16, which are positioned in front of the cages 11, preferably extend outwardly as at 22 and 23, respectively. By providing the outwardly extending portions of the conduit 13, the cross sectional area of the conduit in front of the cages is greater than the cross sectional area of the linear sections 15 and 17, thus positioning more feed in easy reach of the birds in the cages. Also, the outer edges of the trough are so positioned that the birds cannot rake feed out of the trough by their beaks.

Feed is supplied to the conduit 13 by a suitable feed hopper 24 which may be positioned over one of the linear sections. Also, suitable means may be associated with the feed hopper 24 to regulate the flow of feed from the hopper into the conduit 13.

The feed is conveyed around the conduit 13 by conveying apparatus now to be described. Extending longitudinally of each of the linear sections 14, 15, 16 and 17 are flexible members, such as cables 26 which carry a plurality of impellers 27. Each impeller 27 is formed of a relatively flat sheet of material, such as metal, plastic or the like and comprises an intermediate portion 28 which is connected to upper and lower portions 29 and 31, respectively. Preferably, the intermediate portion 28 is formed integrally with the upper and lower portions 29 and 31. The intermediate portion 28 of each impeller 27 is provided with a centrally disposed opening 32 therethrough for receiving the flexible member 26.

The impellers 27 are held in longitudinally spaced relation to each other along the flexible member 26 by any suitable means. In the drawing, we show tubular members 33 which surround the flexible member 26 intermediate adjacent impellers 27 whereby the impellers are held in longitudinally spaced relationship to each other. That is, the tubular members 33 are of a diameter greater than the internal diameter of the opening 32 whereby the ends of each tubular member 33 engage the intermediate portions 28 of the adjacent impellers 27.

The lower portion 31 of each impeller 27 is inclined downwardly and forwardly in the direction of travel of the feed "F" whereby, upon longitudinal movement of the flexible member 26 in a forward direction, the inclined lower portion 31 digs into the feed to move the same forward. On the other hand, upon longitudinal movement of the flexible member 26 in the opposite direction or on the return stroke, the inclined lower portion 31 engages the feed "F" to raise the impeller, whereby all of the impellers and the entire flexible member 26 are raised relative to the feed, thus permitting the impellers 27 to move over and relative to the feed.

The upper portion 29 of each impeller 27 extends forwardly in the direction of travel of the feed "F" whereby it is in position to prevent spillage of the feed over the impeller as the impeller moves forward. Preferably, the upper portion 29 of each impeller 27 extends upwardly and forwardly whereby the upper level of the feed "F" in the conduit 13 may extend well above the intermediate portion 28 of the impeller without actually passing over the impeller upon forward movement of the impeller.

The ends of the flexible members 26 adjacent each of the arcuate sections 18, 19, 20 and 21 are connected to each other by an arcuate member 34 which is carried by an arm member 36. The inner end of each arm member 36 is pivotally connected by means of a pin 37 to a suitable supporting structure, as shown. V-shaped impellers 38, as viewed in plan, are carried by the arcuate members 34 whereby the feed is conveyed around the arcuate sections upon reciprocation of the flexible member 26.

To impart reciprocatory motion to the flexible member 26, we connect one of the arm members 36 to a suitable source of power, as shown in FIG. 1. A link 39 pivotally connects one of the arm members 36 to a rotary member 41 which may be in the form of an arm connected to the upper end of the shaft 42 of a speed reduction unit indicated generally at 43. A shaft 44 connects the speed reduction unit 43 to a motor 46. Accordingly, upon energizing the motor 46, the rotary member 41 is rotated to impart reciprocatory motion to the link 39 and the arm 36 whereby the associated arcuate member 34 is reciprocated within the arcuate section 19 of the conduit 13. In view of the fact that the flexible members 26 are connected to the arcuate members 34, they are in turn reciprocated with the arcuate members 34.

From the foregoing description, the operation of our improved apparatus for conveying granular materials, such as feed, along a conduit will be readily understood. The feed is placed in the hopper 24 whereupon it is discharged into the conduit 13 in a controlled manner well understood in the art. Upon energizing the motor 46, the arcuate members 34 and the flexible members 26 are reciprocated. Upon forward movement of the flexible member 26 and the impellers 27, as shown in FIG. 4, the lower portions 31 of the impellers dig into the feed "F" whereby it is pushed forward between the side walls of the conduit 13. In view of the fact that the upper portion 29 of each impeller 27 extends forwardly and upwardly in the direction of feed travel, a substantial amount of feed may be moved between adjacent impellers. That is, the feed may extend at a substantial elevation above the intermediate portion 28 of the impellers without spillage over the impellers as the impellers move forward.

Upon rearward movement of the impellers 27 and the flexible member 26, as shown in FIG. 3, the inclined lower portions 31 of the impellers engage the feed "F," whereby each impeller rides over the feed on the return stroke. That is, the inclined lower portion 31 causes each impeller to raise relative to the feed "F" and travel over the top of the feed as long as the impellers are moving rearwardly. However, as soon as the forward stroke is commenced, the lower inclined portion 31 again digs into the feed "F" to convey the same forward.

In actual practice, we have found that by placing the impellers 27 at approximately 4 inches apart and reciprocating the flexible member 26 approximately 6 inches, there is sufficient overlap in the travel of adjacent impellers 27 to continuously convey the feed forward as the flexible member is reciprocated.

In FIG. 6 of the drawing, the show our improved impellers 27 mounted for conveying granular material around corners. The impellers 27 are mounted on an arcuate member 47 having upturned end portions 48 which extend through and are adapted for vertical movement relative to bearing members 49 which are carried by opposite ends of a second arcuate member 51. To impart reciprocatory motion to the arcuate member 51 and in turn the arcuate member 47, we connect one end of an arm 52 to the arcuate member 51 by any suitable means, such as by welding at 53. The inner end of the arm 52 is pivotally connected by means of a suitable bearing member 54 to a supporting structure, not shown. One of the arms 52 may be connected to a suitable source of power, such as the power operated means connected to the arm 36 whereby reciprocatory motion is imparted to the entire assembly. The ends of the arcuate member 51 are provided with depending brackets 56 and attached to the brackets 56 by suitable connectors 57 are the ends of the cables 26 described hereinabove.

The operation of the apparatus shown in FIG. 6 is substantially the same as that of the apparatus described hereinabove. That is, the lower portion 31 of each impeller 27 being inclined downwardly and forwardly digs into the feed as the impeller 27 is moved forwardly. On the other hand, upon longitudinal movement of the arcuate member 47 in the opposite direction or on the return stroke, the inclined lower portion 31 engages the feed to raise the impeller 27 whereby all of the impellers carried by the arcuate member 47 raise relative to the feed. Free vertical movement of the arcuate member 47 is provided by providing the sliding fit between the upturned ends 48 of the arcuate member and the bearing members 49.

From the foregoing, it will be seen that we have devised improved apparatus for conveying feed and other granular materials through a generally horizontal conduit. By forming relatively wide impellers which extend substantially the width of the conduit, together with the inclined forwardly extending lower portion, a sturdy construction is provided and a maximum amount of feed is conveyed forward as the impellers are reciprocated. At the same time, a minimum amount of feed is moved rearwardly on the return stroke of the impellers. Also, by providing the forwardly extending upper portion on the impellers, the feed does not move over the impellers as the impellers move forward. Furthermore, by extending the upper portion of the impeller 27 upwardly and forwardly, a maximum amount of feed may be conveyed in the conduit without passage of the feed over the impellers as the impellers move forward.

While we have described our apparatus as being particularly adapted for conveying feed, such as poultry feed, it will be apparent that it is adapted for conveying feed for other stock and for conveying other granular materials which permit the impellers to dig into the material to move the same forward on the forward stroke and permit the impellers to raise relative to the granular material on the return stroke whereby the impellers and the flexible member carrying the same are raised to ride over the granular material on the return stroke.

While we have shown our invention in but two forms, it will be obvious to those skilled in the art that it is not so limited, but is susceptible of various other changes and modifications without departing from the spirit thereof, and we desire, therefore, that only such limitations shall be placed thereupon as are specifically set forth in the appended claims.

What we claim is:

1. In apparatus for conveying granular material in a substantially horizontal conduit, an elongated actuating member within and extending longitudinally of said conduit and adapted for free vertical movement relative thereto, a plurality of longitudinally spaced impellers carried by said actuating member, each of said impellers having a lower portion which is inclined downwardly and forwardly in the direction of travel of the granular material and an upper portion which extends forwardly in the direction of travel of the granular material whereby upon longitudinal movement of said actuating member in a forward direction the inclined lower portion of each impeller digs into the granular material to move the same forward and upon longitudinal movement of the actuating member in the opposite direction the inclined lower portion of each impeller engages the granular material to raise the impellers and the entire actuating member relative to the granular material whereby the impellers move over and relative to the granular material, and means to reciprocate said actuating member whereby the granular material is conveyed forward by said impellers.

2. Apparatus for conveying granular material as defined in claim 1 in which the upper and lower portions of each impeller extend substantially the width of the conduit.

3. Apparatus for conveying granular material as defined in claim 1 in which the upper portion of each impeller extends upwardly and forwardly in the direction of travel of the granular material.

4. In appaartus for conveying granular material in a substantially horizontal conduit, an elongated flexible member within and extending longitudinally of said conduit and adapted for free vertical movement relative thereto, a plurality of longitudinally spaced impellers carried by said flexible member, each of said impellers comprising a relatively flat lower portion which is inclined downwardly and forwardly in the direction of travel of the granular material and a relatively flat upper portion which extends forwardly in the direction of travel of the granular material, whereby upon longitudinal movement of said flexible member in a forward direction the inclined lower portion of each impeller digs into the granular material to move the same forward and upon longitudinal movement of the flexible member in the opposite direction the inclined lower portion of each impeller engages the granular material to raise the impellers and the entire flexible member relative to the granular material whereby the impellers move over and relative to the granular material, and means to reciprocate said flexible member whereby the granular material is conveyed forward by said impellers.

5. Apparatus for conveying granular material as defined in claim 4 in which the upper and lower portions of each impeller are relatively flat and extend substantially the entire width of the conduit.

6. Apparatus for conveying granular materials as defined in claim 5 in which the upper and lower portions of each impeller are joined by a substantially vertically extending intermediate portion.

7. In apparatus for conveying granular material in a substantially horizontal conduit, an elongated flexible member within and extending longitudinally of said conduit and adapted for free vertical movement relative thereto, a plurality of longitudinally spaced impellers carried by said flexible member and extending transversely of said conduit, each of said impellers having open sides and comprising a relatively flat upper portion which extends forwardly in the direction of travel of the granular material and a relatively flat lower portion joined to said upper portion by a substantially vertical intermediate portion, there being an opening through said intermediate portion for receiving said flexible member, means holding said impellers at longitudinally spaced intervals along said flexible member whereby the impellers move with said flexible member, said lower portion of each impeller being inclined downwardly and forwardly in the direction of travel of the granular material whereby upon longitudinal movement of said flexible member in a forward direction the inclined lower portion of each impeller digs into the granular material to move the same forward and upon longitudinal movement of the flexible member in the opposite direction the inclined lower portion of each impeller engages the granular material to raise the impellers and the entire flexible member relative to the granular material whereby the impellers move over and relative to the granular material, and means to reciprocate said flexible member whereby the granular material is conveyed forward by said impellers.

8. Apparatus as defined in claim 7 in which the flexible member is a cable and the impellers are held at longitudinally spaced intervals by tubular members which telescope over the cable between adjacent impellers.

9. A stock feeder comprising a substantially horizontally open-top conduit affording access by stock to feed contained therein, means to introduce granular feed into said conduit, a flexible member within and extending longitudinally of said conduit and adapted for free vertical movement relative thereto, a plurality of longitudinally spaced feed impellers carried by said flexible member, each of said impellers having open sides and comprising a lower portion which is inclined downwardly and forwardly in the direction of travel of the feed and an upper portion which extends forwardly in the direction of travel of the feed whereby upon longitudinal movement of said flexible member in a forward direction the inclined lower portion of each impeller digs into the feed to move the same forward and upon longitudinal movement of the flexible member in the opposite direction the inclined lower portion of each impeller engages the feed to raise the impellers and the entire flexible member relative to the feed whereby the impellers move over and relative to the feed, and means to reciprocate said flexible member whereby the feed is conveyed forward by said impellers.

10. In apparatus for conveying granular material around a horizontally disposed conduit corner, an arcuate shaped actuating member adapted for free vertical movement within said conduit corner and extending in a generally horizontal plane, a plurality of longitudinally spaced impellers carried by said actuating member, each of said impellers having open sides and comprising a lower portion which is inclined downwardly and forwardly in the direction of travel of the granular material and an upper portion which extends forwardly in the direction of travel of the granular material whereby upon arcuate movement of said actuating member in a forward direction the inclined lower portion of each impeller digs into the granular material to move the same forward and upon arcuate movement of the actuating member in the opposite direction the inclined lower portion of each impeller engages the granular material to raise the impellers and the entire actuating member relative to the granular material whereby the impellers move over and relative to the granular material, and means to reciprocate said actuating member whereby the granular material is conveyed forward around said conduit corner by said impellers.

11. Apparatus as defined in claim 10 in which the ends of the arcuate actuating member are turned upward and a second arcuate member is operatively connected to the ends of the first mentioned arcuate member, there being bearing members adjacent the ends of said second arcuate member for receiving said ends of the first mentioned arcuate member, whereby the first mentioned arcuate member is adapted for vertical movement relative to the second arcuate member.

12. Apparatus as defined in claim 11 in which the second arcuate member is mounted adjacent the free end of a pivoted arm member.

13. A stock feeder comprising a substantially horizontal open-top conduit affording access by stock to feed contained therein, said conduit comprising a plurality of straight sections connected by arcuate sections to form a continuous endless conduit, an elongated flexible arcuating member within each of the straight sections and adapted for free vertical movement relative thereto, an arcuate actuating member adapted for free vertical movement within each of the arcuate sections and connected at each end thereof to a flexible actuating member, a plurality of impellers mounted on each of said actuating members, means mounting said arcuate actuating members for vertical movement, said impellers having a lower portion which is inclined downwardly and forwardly in the direction of travel of the feed whereby upon longitudinal movement of said actuating members the impellers dig into the feed to move the same forwardly and upon longitudinal movement of the actuating members in the opposite direction the inclined lower portion of each impeller engages the feed to raise the impellers along with the actuating members relative to the feed whereby the impellers move over and relative to the feed, and means to reciprocate said actuating members to convey feed by the impellers.

References Cited in the file of this patent

UNITED STATES PATENTS

| | | |
|---|---|---|
| 1,643,786 | Peale | Sept. 27, 1927 |
| 2,369,720 | Crane | Feb. 20, 1945 |
| 2,555,338 | Hapman | June 5, 1951 |
| 2,681,132 | Knutson | June 15, 1954 |
| 2,956,667 | Coulliette et al. | Oct. 18, 1960 |